US012592435B2

(12) United States Patent
Uchida et al.

(10) Patent No.: US 12,592,435 B2
(45) Date of Patent: Mar. 31, 2026

(54) SEALED POWER STORAGE DEVICE

(71) Applicants: Prime Planet Energy & Solutions, Inc., Tokyo (JP); TOYOTA JIDOSHA KABUSHIKI KAISHA, Aichi-ken (JP); PRIMEARTH EV ENERGY CO., LTD., Shizuoka-ken (JP)

(72) Inventors: Yozo Uchida, Toyota (JP); Tsuyoshi Ehara, Toyota (JP); Yuki Sato, Toyota (JP); Syoichi Tsuchiya, Toyota (JP); Masataka Asai, Toyota (JP); Tsuyoshi Asano, Toyota (JP); Masahiro Uchimura, Toyota (JP); Shigeru Matsumoto, Toyohashi (JP); Yasuaki Nagano, Kosai (JP)

(73) Assignees: PRIME PLANET ENERGY & SOLUTIONS, INC., Tokyo (JP); TOYOTA JIDOSHA KABUSHIKI KAISHA, Aichi-Ken (JP); TOYOTA BATTERY CO., LTD., Shizuoka-Ken (JP)

( * ) Notice: Subject to any disclaimer, the term of this patent is extended or adjusted under 35 U.S.C. 154(b) by 484 days.

(21) Appl. No.: 18/303,571

(22) Filed: Apr. 20, 2023

(65) Prior Publication Data

US 2023/0387516 A1     Nov. 30, 2023

(30) Foreign Application Priority Data

May 26, 2022    (JP) ................................. 2022-086249

(51) Int. Cl.
H01M 50/121        (2021.01)
H01M 50/103        (2021.01)
(Continued)

(52) U.S. Cl.
CPC ....... H01M 50/121 (2021.01); H01M 50/103 (2021.01); H01M 50/15 (2021.01); H01M 50/16 (2021.01); H01M 50/176 (2021.01)

(58) Field of Classification Search
CPC ............ H01M 50/121; H01M 50/176; H01M 50/103; H01M 50/16; H01M 50/15
See application file for complete search history.

(56) References Cited

U.S. PATENT DOCUMENTS

| | | | |
|---|---|---|---|
| 2015/0155532 A1* | 6/2015 | Harayama ........... | H01M 50/553 |
| | | | 429/179 |
| 2018/0069200 A1* | 3/2018 | Ono ...................... | H01M 50/55 |
| 2019/0080855 A1* | 3/2019 | Kenko .............. | H01M 10/0436 |

FOREIGN PATENT DOCUMENTS

| | | |
|---|---|---|
| JP | 2007-036026 A | 2/2007 |
| JP | 2008-21507 A | 1/2008 |

(Continued)

OTHER PUBLICATIONS

2014060138 MT (Year: 2014).*
The decision of JPO to grant a Patent for Application JP 2022086249 (Year: 2024).*

*Primary Examiner* — Alexander Usyatinsky
(74) *Attorney, Agent, or Firm* — HAUPTMAN HAM, LLP

(57) ABSTRACT

In a sealed power storage device, a device case includes a resin case body with an opening and a resin lid closing the opening. The resin lid is made of electrical insulation resin. A metal terminal member is extended from inside to outside of the device case, penetrating through the resin lid. The resin lid is hermetically molded together with the metal terminal member so that the resin lid is directly joined to the outer peripheral surface of the metal terminal member without interposing another member between the resin lid and the metal terminal member.

4 Claims, 6 Drawing Sheets

(51) Int. Cl.
    *H01M 50/15*       (2021.01)
    *H01M 50/16*       (2021.01)
    *H01M 50/176*     (2021.01)

(56)             References Cited

FOREIGN PATENT DOCUMENTS

| | | | |
|----|----|----|----|
| JP | 2008-47437 | A | 2/2008 |
| JP | 2014060138 | A * | 4/2014 |
| JP | 2018-41668 | A | 3/2018 |
| JP | 2022-28587 | A | 2/2022 |

* cited by examiner

41(45)

44(48)

SEALED POWER STORAGE DEVICE

CROSS-REFERENCE TO RELATED APPLICATIONS

This application is based upon and claims the benefit of priority to Japanese Patent Application No. 2022-086249 filed on May 26, 2022, the entire contents of which are incorporated herein by reference.

BACKGROUND

Technical Field

The present disclosure relates to a sealed power storage device.

Related Art

Japanese unexamined patent application publication No. 2018-041668 discloses a sealed power storage device including an electrode body, an electrolytic solution, a metal device case accommodating the electrode body and the electrolytic solution, and a metal terminal member connected to the electrode body and extended from inside to outside of the device case. The device case is provided with a metal case body having an opening and a metal lid closing the opening of the case body. The metal case body and the metal lid are joined together by welding, constituting the device case.

SUMMARY

Technical Problems

Meanwhile, the metal terminal member extends from inside to outside of the device case, penetrating through the metal lid. To ensure electrical insulation between the metal terminal member and the metal lid, a plurality of electrical insulation members are interposed between the metal terminal member and the metal lid. Furthermore, the metal terminal member is subjected to a swaging process to fix those electrical insulation members and the metal terminal member to the metal lid.

However, the above-configured sealed power storage device, including many components, needs many processes for manufacture. This would lead to long manufacturing time and high manufacturing cost. For easy manufacture of the sealed power storage device, the lid is required to be a resin lid made of electrical insulating resin. This is because such a lid formed of an electrical insulating resin lid can eliminate the need to provide any additional electrical insulation member(s) between a resin lid and a metal terminal member extending through the resin lid from inside to outside of a device case.

The present disclosure has been made to address the above problems and has a purpose to provide a sealed power storage device including a resin lid and a metal terminal member extending through the resin lid from inside to outside of a device case, the resin lid being hermetically directly joined to the metal terminal member.

Means of Solving the Problems (1) To achieve the above-mentioned purpose, one aspect of the present disclosure provides a sealed power storage device comprising: an electrode body; an electrolytic solution; a device case accommodating the electrode body and the electrolytic solution; and a metal terminal member connected to the electrode body and extended from inside to outside of the device case, wherein the device case includes: a case body having an opening; and a lid closing the opening of the case body, the lid is a resin lid made of a resin having electrical insulation, the metal terminal member is extended from inside to outside of the device case to penetrate through the resin lid, and the resin lid is hermetically integrated with the metal terminal member in a form of directly joining to an outer peripheral surface of the metal terminal member without interposing another member between the resin lid and the metal terminal member.

In the above-described sealed power storage device, the device case includes the resin lid made of the resin having electrical insulation (electrical insulation resin). Further, the metal terminal member extends from the inside to the outside of the device case, penetrating through the resin lid. The resin lid is hermetically integrated with the metal terminal member in the form of directly joining to the outer peripheral surface of the metal terminal member without any other members interposed between the resin lid and the metal terminal member. The thus configured sealed power storage device is a sealed power storage device that includes a resin lid and a metal terminal member extending from the inside of the device case to the outside by penetrating the resin lid, and the resin lid is hermetically directly joined to the metal terminal member. The sealed power storage device may include for example a sealed battery, a sealed capacitor, and others.

(2) In the sealed power storage device described above in the above configuration (1), the outer peripheral surface of the metal terminal member may include an annular roughened surface having pits and protrusions and extending to make a circuit of a periphery of the metal terminal member, and the resin lid may be hermetically joined to the annular roughened surface by a part of the resin that forms the resin lid, the part of the resin entering into the pits of the annular roughened surface of the metal terminal member.

In the foregoing sealed power storage device, the resin lid (specifically, a portion of the resin lid surrounding the periphery of the metal terminal member) is hermetically joined to the annular roughened surface by entering, or penetrating, of a part of the resin that forms the resin lid into the pits of the annular roughened surface, that is, an annular roughened surface having an uneven shape with pits and protrusions, of the metal terminal member. In other words, the resin lid is hermetically joined to the annular roughened surface by the anchor effect attained by biting of the protrusions of the annular roughened surface of the metal terminal member into the resin lid, concretely, the portion of the resin lid surrounding the periphery of the metal terminal member. This can enhance the hermeticity between the resin lid and the metal terminal member, thus increasing the hermeticity of the sealed power storage device.

(3) In the sealed power storage device described above in the above configuration (1) or (2), the case body may be a resin case body made of a resin having electrical insulation, and the device case is a resin device case including the resin case body and the resin lid joined to each other.

In the foregoing sealed power storage device, the device case is a device case made of resin, so that the weight of the device case can be reduced. In addition, since the resin lid and the resin case body, which constitute the resin device case, are both made of electrical insulation resin, there is no need to provide any additional electrical insulation member, such as an electrical insulation film, between the device case and the electrode body accommodated in the device case, to ensure the electrical insulation property therebetween. A method of joining the resin case body and the resin lid may include for example a method of thermally welding the resin lid to an opening of the resin case body so that the resin lid hermetically seals the opening of the case body.

(4) In the sealed power storage device described above in one of the above configurations (1) to (3), the resin that forms the resin lid may be either polyphenylene sulfide or polyarylene sulfide, or alternatively, the resin that forms the resin lid and the resin that forms the resin case body may be either polyphenylene sulfide or polyarylene sulfide.

In the foregoing sealed power storage device, the resin forming the resin lid of the device case is either polyphenylene sulfide (hereinafter referred to as PPS) or polyarylene sulfide (hereinafter referred to as PAS). Alternatively, the resin forming the resin lid of the device case and the resin forming the resin case body are PPS or PAS. These resins, PPS and PAS, exhibit low moisture permeability and low electrolyte permeability, and high electrolyte resistance, and are usable for injection molding. Thus, PPS and PAS are suitable as resins to form the resin lid and the resin case body of the device case.

Accordingly, the above-described sealed power storage device includes the resin lid made of PPS or PAS, or alternatively, the resin lid and the resin case body both made of PPS or PAS. The thus configured sealed power storage device can prevent electrolyte components from permeating through the device case and leaking to the outside over a long period of time and also prevent moisture from permeating through the device case and entering into the device case, and can achieve stable device characteristics over a long period of time.

DETAILED DESCRIPTION OF THE EXEMPLARY EMBODIMENTS

Figure 1:
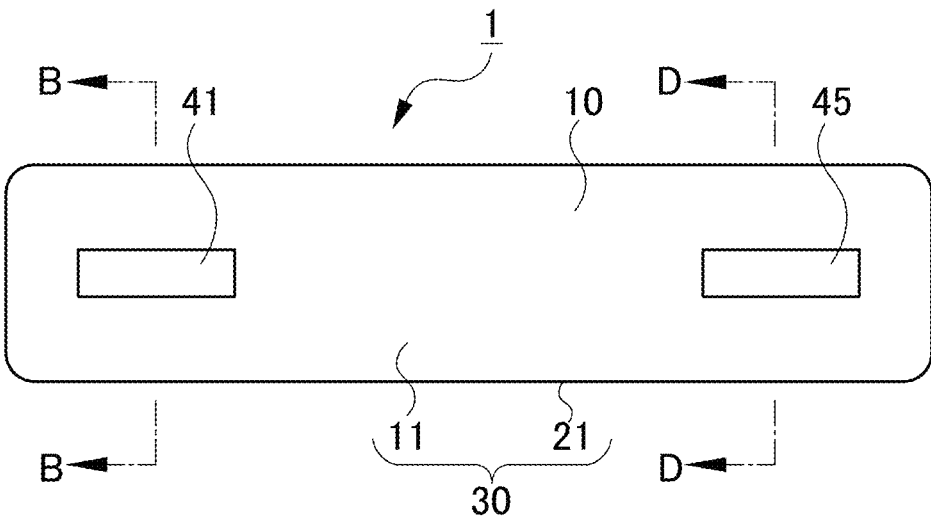
FIG. 1 is a plan view, or a top view, of a sealed power storage device in an embodiment.
Figure 2:
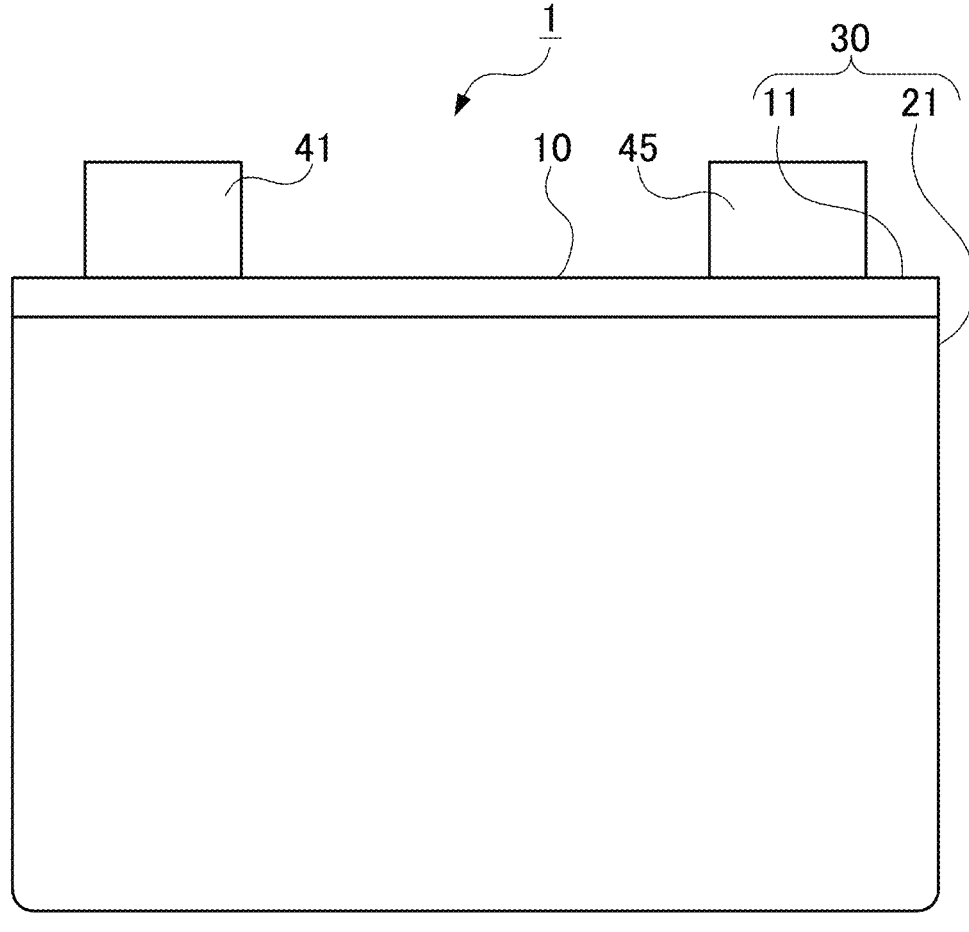
FIG. 2 is a front view of the sealed power storage device.

A detailed description of an embodiment of this disclosure will now be given referring to the accompanying drawings. A sealed power storage device 1 in the present embodiment is a sealed battery, concretely, a lithium ion secondary battery. This sealed power storage device 1 includes an electrode body 50, an electrolytic solution 90, a device case 30 accommodating the electrode body 50 and the electrolytic solution 90, a positive terminal member 41, and a negative terminal member 45, referring to FIGS. 1 to 3.

The device case 30 is a hard case made of electrical insulation resin and has a rectangular parallelepiped box-like shape. This device case 30 is a resin device case and includes a resin case body 21 having a rectangular tubular shape with a closed bottom, and a resin lid 11 having a rectangular flat plate shape that closes an opening 21b of the resin case body 21, referring to FIGS. 1 to 3. The resin lid 11 and the resin case body 21 are both made of electrical insulation resin, concretely, which is polyphenylene sulfide (PPS) in the present embodiment.

Figure 3:
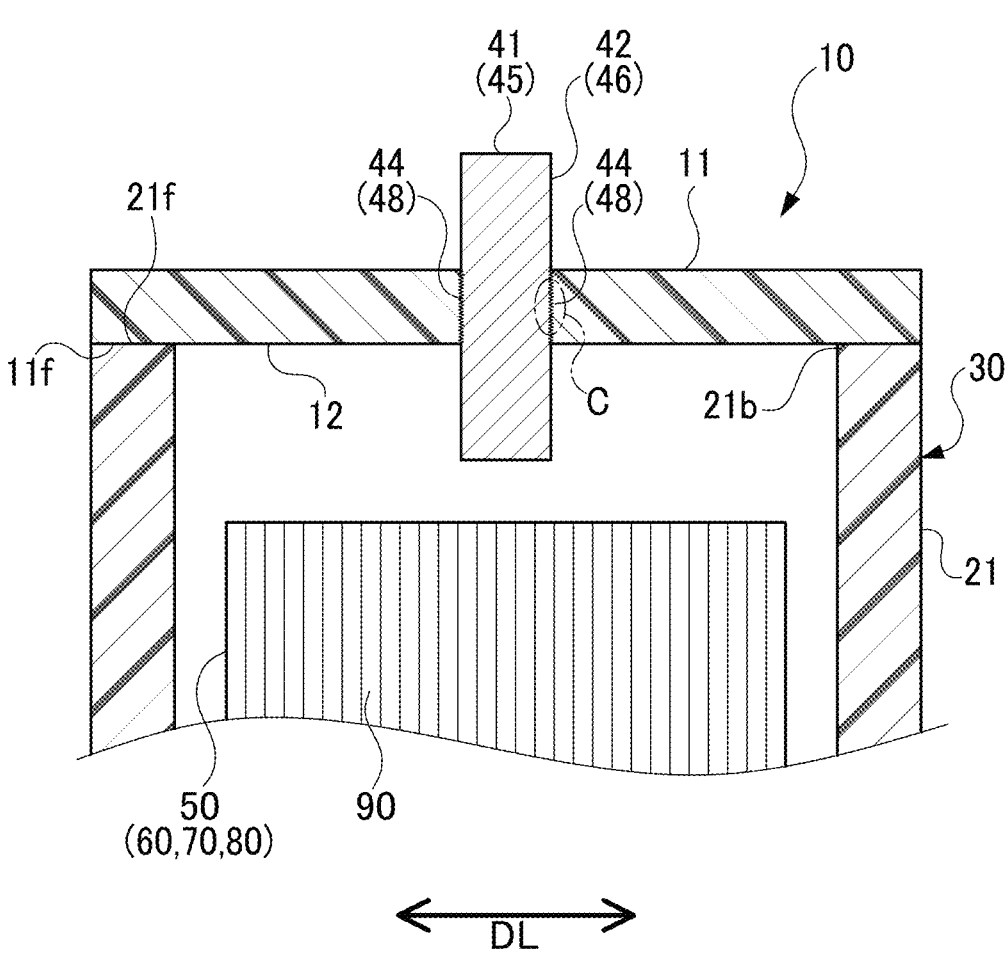
FIG. 3 is a cross-sectional view taken along B-B and D-D in FIG. 1.

The electrode body 50 includes positive electrode sheets 60, negative electrode sheets 70, and separators 80 interposed between the positive electrode sheet 60 and the negative electrode sheet 70. More concretely, the electrode body 50 is a lamination electrode body provided with a plurality of positive electrode sheets 60, a plurality of negative electrode sheets 70, and a plurality of separators 80, in which the positive electrode sheets 60 and the negative electrode sheets 70 are alternately laminated, or stacked, with the separators 80 each interposed therebetween in a lamination direction DL as shown in FIG. 3. The electrode body 50 further contains the electrolytic solution 90. This electrolytic solution 90 is also accommodated in the device case 30 on its bottom side. The positive electrode sheets 60 of the electrode body 50 are connected to a positive terminal member 41 through a positive current collecting tab (not shown) within the device case 30. In contrast, the negative electrode sheets 70 are connected to a negative terminal member 45 through a negative current collecting tab (not shown) within the device case 30.

The positive terminal member 41 is a metal terminal member and is connected to the positive electrode sheets 60 of the electrode body 50 through the positive current collecting tab (not shown) inside the device case 30. This positive terminal member 41 extends from inside to outside of the device case 30 to penetrate through the resin lid 11 in its thickness direction as shown in FIG. 3. The negative terminal member 45 is a metal terminal member and is connected to the negative electrode sheets 70 of the electrode body 50 through the negative current collecting tab (not shown) inside the device case 30. This negative terminal member 45 extends from inside to outside of the device case 30 to penetrate through the resin lid 11 in the thickness direction as shown in FIG. 3.

Figure 4:
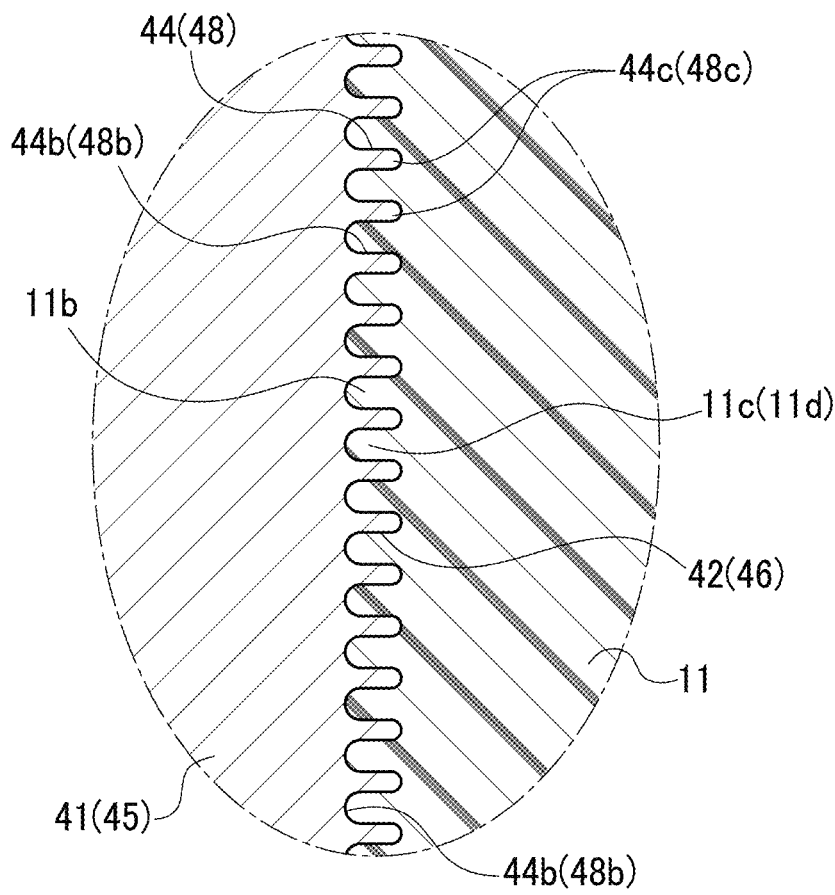
FIG. 4 is an enlarged view of a section C in FIG. 3 and a section G in FIG. 6.

The resin lid 11 is hermetically integrated with the positive terminal member 41 and the negative terminal member 51 in the form of directly and hermetically joining to an outer peripheral surface 42 of the positive terminal member 41 and an outer peripheral surface 46 of the negative terminal member 45 without interposing any other members between the resin lid 11 and each of the positive terminal member 41 and the negative terminal member 45, as shown in FIGS. 3 and 4. Accordingly, the sealed power storage device 1 is configured to include the resin lid 11 and the metal terminal member (concretely, the positive terminal member 41 and the negative terminal member 45) extending from inside to outside of the device case by penetrating through the resin lid 11, the resin lid 11 being hermetically directly joined to the metal terminal member.

Figure 7:
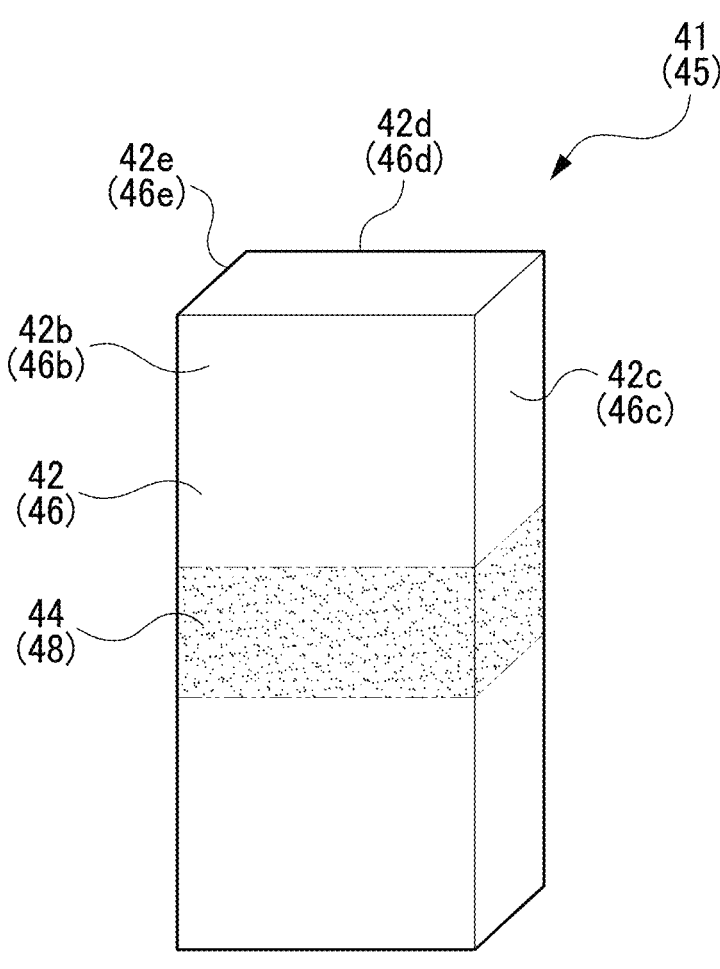
FIG. 7 is a perspective view of a metal terminal member.

The outer peripheral surface 42 of the positive terminal member 41 is composed of a first side surface 42b, a second side surface 42c, a third side surface 42d, and a fourth side surface 42e as shown in FIG. 7. The outer peripheral surface 46 of the negative terminal member 45 is composed of a first side surface 46b, a second side surface 46c, a third side surface 46d, and a fourth side surface 46e as shown in FIG. 7. Thus, the resin lid 11 is directly and hermetically joined to the first side surface 42b, second side surface 42c, third side surface 42d, and fourth side surface 42e of the positive terminal member 41 and also directly and hermetically joined to the first side surface 46b, second side surface 46c, third side surface 46d, and fourth side surface 46e of the negative terminal member 45.

Figure 8:
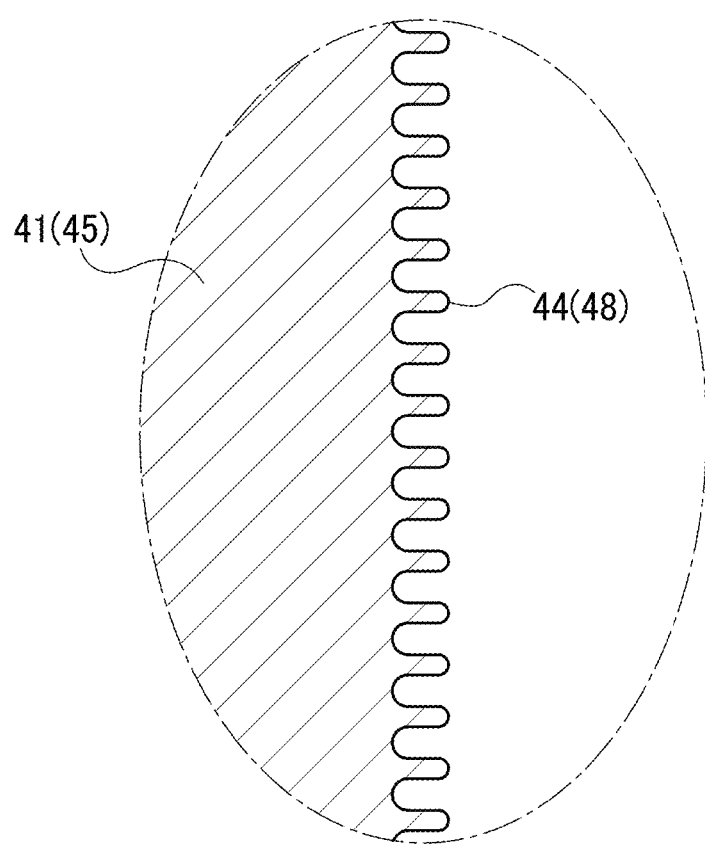
FIG. 8 is an enlarged cross-sectional view of an annular roughened surface of the metal terminal member.

In the sealed power storage device 1 in the present embodiment, particularly, the outer peripheral surface 42 of the positive terminal member 41 includes an annular roughened surface 44 extending in a belt-like shape to make a circuit of the periphery of the positive terminal member 41, i.e., along all the four side surfaces 42b to 42e, as shown in FIG. 7. This annular roughened surface 44 has an uneven shape with pits 44b and protrusions 44c as shown in FIGS. 4 and 8. The resin lid 11 is hermetically joined to the annular roughened surface 44 over its entire circumference by a part 11b of the resin forming the resin lid 11, that is, a portion 11c of the resin lid 11 surrounding the annular roughened surface 44 of the positive terminal member 41, the part 11b (the portion 11c) entering into the pits 44b of the annular roughened surface 44 of the positive terminal member 41 as shown in FIG. 4. In other words, the resin lid 11 is hermetically joined to the annular roughened surface 44 by the anchor effect obtained by biting of the protrusions 44c of the annular roughened surface 44 of the positive terminal member 41 into the resin lid 11, i.e., the portion 11c of the resin lid 11 surrounding the annular roughened surface 44 of the positive terminal member 41. This configuration can enhance the hermeticity between the resin lid 11 and the positive terminal member 41, thus increasing the hermeticity of the sealed power storage device 1.

Furthermore, the outer peripheral surface 46 of the negative terminal member 45 includes an annular roughened surface 48 extending in a belt-like shape to make a circuit of the periphery of the negative terminal member 45, i.e., along all the four side surfaces 46b to 46e, as shown in FIG. 7. This annular roughened surface 48 has an uneven shape with pits 48b and protrusions 48c as shown in FIGS. 4 and 8. The resin lid 11 is hermetically joined to the annular roughened surface 48 over its entire circumference by a part 11b of the resin forming the resin lid 11, that is, a portion 11d surrounding the annular roughened surface 48 of the negative terminal member 45, the part 11b (the portion 11d) entering into the pits 48b of the annular roughened surface 48 of the negative terminal member 45 as shown in FIG. 4. In other words, the resin lid 11 is hermetically joined to the annular roughened surface 48 by the anchor effect caused by biting of the protrusions 48c of the annular roughened surface 48 of the negative terminal member 45 into the resin lid 11, i.e., the portion 11d of the resin lid 11 surrounding the annular roughened surface 48 of the negative terminal member 45. This configuration can enhance the hermeticity between the resin lid 11 and the negative terminal member 45, thus increasing the hermeticity of the sealed power storage device 1.

The annular roughened surface 44 can be formed by a well-known surface roughening treatment applied to the outer peripheral surface 42 of the positive terminal member 41. This treatment may include for example a laser surface treatment, a sandblasting treatment, and an anodizing treatment. One example of the laser surface treatment is disclosed in Japanese unexamined patent application publication No. 2022-028587. In the present embodiment, the laser surface treatment is used to roughen a part of the outer peripheral surface 42 of the positive terminal member 41, i.e., an annular portion of the outer peripheral surface 42 contacting the resin lid 11, to form the annular roughened surface 44. The annular roughened surface 48 of the negative terminal member 45 is similarly formed as with the annular roughened surface 44 of the positive terminal member 41.

Figure 5:
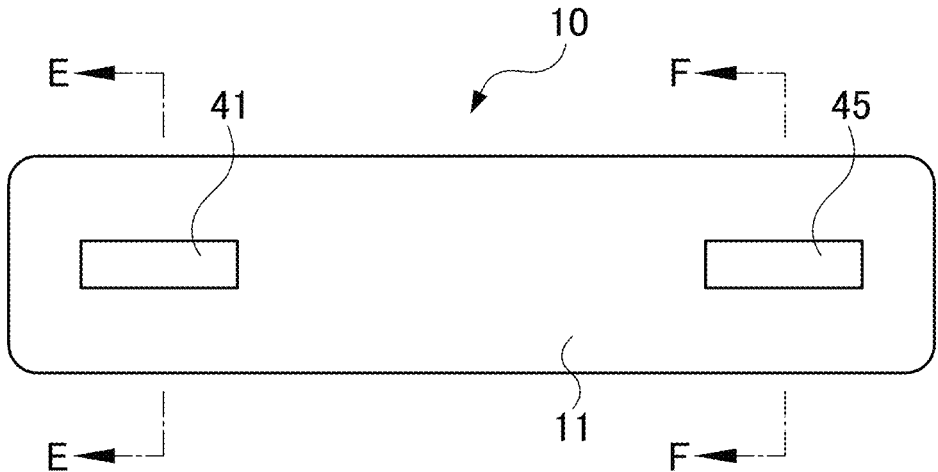
FIG. 5 is a plan view of a terminal-equipped lid, i.e., an insert molded product.
Figure 6:
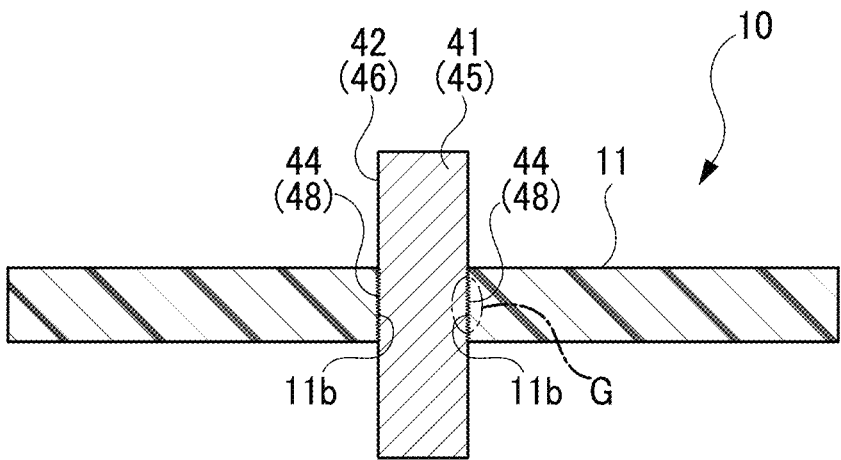
FIG. 6 is a cross-sectional view taken along E-E and F-F in FIG. 5.

The positive terminal member 41, the negative terminal member 45, and the resin lid 11 are integrally formed by insert molding. Specifically, the positive terminal member 41, the negative terminal member 45, and the resin lid 11 are insert-molded to form a terminal-equipped lid 10, which is an insert molded product as shown in FIGS. 5 and 6, including the resin lid 11 integrated with the positive terminal member 41 and the negative terminal member 45.

This terminal-equipped lid 10 is produced as below. Specifically, the positive terminal member 41 having the annular roughened surface 44 and the negative terminal member 45 having the annular roughened surface 48 are prepared first (see FIGS. 7 and 8). Subsequently, with those terminal members 41 and 45 set as inserts, the resin lid 11 is made by injection molding of resin. The terminal-equipped lid 10 is thus produced as the insert molded product in which the positive terminal member 41, negative terminal member 45, and resin lid 11 are integrally formed together, as shown in FIGS. 5 and 6.

Since the terminal-equipped lid 10 is produced by insert molding of integrally forming the positive terminal member 41, negative terminal member 45, and resin lid 11, it is possible to easily and appropriately manufacture the sealed power storage device 1 in which the resin lid 11 is directly and hermetically joined to the metal terminal members (specifically, the positive terminal member 41 and the negative terminal member 45) penetrating through the resin lid 11 to extend from the inside to the outside of the device case 30.

A part 11b of the resin injected to mold the resin lid 11, concretely, a portion 11c of the resin surrounding the annular roughened surface 44 of the positive terminal member 41 and a portion 11d of the resin surrounding the annular roughened surface 48 of the negative terminal member 45, enter into the pits 44b of the annular roughened surface 44 of the positive terminal member 41 and the pits 48b of the annular roughened surface 48 of the negative terminal member 45. Thus, the resin lid 11 is hermetically joined to the annular roughened surface 44 and the annular roughened surface 48 as shown in FIG. 4.

In the sealed power storage device 1, moreover, the device case 30 is made of resin and hence light in weight. In addition, since both the resin lid 11 and the resin case body 21, constituting the device case 30, are made of electrical insulation resin, i.e., PPS, there is no need to provide any additional electrical insulation member, such as an electrical insulation film, to ensure the electrical insulation between the device case 30 and the electrode body 50 accommodated in the device case 30.

The device case 30 is fabricated by joining the resin case body 21 and the resin lid 11 together by heat welding as described below. Specifically, the terminal-equipped lid 10 and the electrode body 50 are prepared first. The positive terminal member 41 of the terminal-equipped lid 10 is connected to the positive electrode sheets 60 of the electrode body 50 through the positive current collecting tab (not shown) and similarly the negative terminal member 45 of the terminal-equipped lid 10 is connected to the negative electrode sheets 70 of the electrode body 50 through the negative current collecting tab (not shown). Thus, the terminal-equipped lid 10 is connected to the electrode body 50.

A joined portion 11f of the resin lid 11 of the terminal-equipped lid 10, which is to be joined to the resin case body 21, is softened or melted by heating and similarly the joined portion 21*f* of the resin case body 21, which is to be joined to the resin lid 11, is softened or melted by heating. The joined portion 11*f* of the resin lid 11 is a circumferential edge portion of the resin lid 11 on a back surface 12 (see FIG. 3). The joined portion 21*f* of the resin case body 21 is an annular end portion of the resin case body 21 around the opening 21*b* (see FIG. 3).

While the joined portion 11*f* of the resin lid 11 and the joined portion 21*f* of the resin case body 21 are softened or melted, the electrode body 50 connected to the terminal-equipped lid 10 is inserted in the resin case body 21 and then the opening 21*b* of the resin case body 21 is closed with the resin lid 11 of the terminal-equipped lid 10 in a manner that the joined portion 11*f* of the resin lid 11 and the joined portion 21*f* of the resin case body 21 contact with each other. Accordingly, the joined portion 11*f* of the resin lid 11 and the joined portion 21*f* of the resin case body 21 are bonded together. Thus, the device case 30 is completed with the opening 21*b* of the resin case body 21 hermetically sealed by the resin lid 11.

In the sealed power storage device 1, the resin lid 11 and the resin case body 21 of the device case 30 are both made of a resin, i.e., PPS in the present embodiment. PPS is a resin with low permeability to moisture and the electrolytic solution 90, high resistance to the electrolytic solution 90, and can be used for injection molding. Such a PPS is suitable for forming the resin lid 11 and the resin case body 21 of the device case 30.

For this reason, the sealed power storage device 1 in the present embodiment includes the resin lid 11 and the resin case body 21, each made of PPS, as described above. The sealed power storage device 1 can therefore prevent leakage of the electrolytic solution 90 contained in the device case 30 to the outside of the device case 30 by permeating through the walls of the device case 30 for a long period of time. Consequently, the sealed power storage device 1 can exhibit stable device characteristics, concretely, battery characteristics, for a long time.

The present disclosure is described in the foregoing embodiment, but is not limited thereto. It should be understood that the present disclosure may be embodied in other specific forms without departing from the essential characteristics thereof.

For instance, the foregoing embodiment exemplifies the electrode body 50 configured as a lamination electrode body in which the positive electrode sheets 60 and the negative electrode sheets 70 are alternately laminated with the separators 80 interposed therebetween in the lamination direction DL. As an alternative, the electrode body of the sealed power storage device of the present disclosure is not limited to the lamination electrode body but may be applied to any of various types of electrode bodies. For example, the electrode body may be a wound electrode body in which a positive electrode sheet and a negative electrode sheet are wound with separators interposed therebetween.

In the foregoing embodiment, the resin lid and the resin device case are embodied by the resin lid 11 and the resin case body 21 each made of PPS. As an alternative, the resin lid and the resin device case may be a resin lid and a resin device case each made of polyarylene sulfide (PAS). PAS is a resin with low permeability to moisture and the electrolytic solution 90 and high resistance to the electrolytic solution 90. The resin lid and the resin device case each made of PAS can exhibit stable device characteristics for a long period of time. Further, a resin lid and a resin case body each made of olefin resin or fluororesin may also be used.

REFERENCE SIGNS LIST

1 Sealed power storage device
10 Terminal-equipped lid
11 Resin lid (Lid)
21 Resin case body (Case body)
21*b* Opening
30 Device case (Resin device case)
41 Positive terminal member (Metal terminal member)
42,46 Outer peripheral surface
44,48 Annular roughened surface
44*b*,48*b* Pit
45 Negative terminal member (Metal terminal member)
50 Electrode body
90 Electrolytic solution

What is claimed is:

1. A sealed power storage device, comprising:
an electrode body;
an electrolytic solution;
a device case accommodating the electrode body and the electrolytic solution; and
a metal terminal member connected to the electrode body and extended from inside to outside of the device case,
wherein the device case includes:
a case body having an opening; and
a lid closing the opening of the case body,
the lid is a resin lid made of a resin having electrical insulation,
the metal terminal member is extended from inside to outside of the device case to penetrate through the resin lid,
the resin lid is hermetically integrated with the metal terminal member in a form of directly joining to an outer peripheral surface of the metal terminal member without interposing another member between the resin lid and the metal terminal member,
the outer peripheral surface of the metal terminal member includes an annular roughened surface having pits and protrusions and extending to make a circuit of a periphery of the metal terminal member, and
the resin lid is hermetically joined to the annular roughened surface by a part of the resin that forms the resin lid, the part of the resin entering into the pits of the annular roughened surface of the metal terminal member.

2. The sealed power storage device according to claim 1, wherein
the case body is a resin case body made of a resin having electrical insulation, and
the device case is a resin device case including the resin case body and the resin lid joined to each other.

3. The sealed power storage device according to claim 1, wherein the resin that forms the resin lid is either polyphenylene sulfide or polyarylene sulfide.

4. The sealed power storage device according to claim 2, wherein the resin that forms the resin lid and the resin that forms the resin case body are either polyphenylene sulfide or polyarylene sulfide.

* * * * *